United States Patent Office 3,288,794
Patented Nov. 29, 1966

3,288,794
METHOD OF MAKING AMIDES OF DIMETHYL-
AMINE AND PIPERAZINE
Vincent P. Kuceski, Chicago Heights, Ill., assignor to The
C. P. Hall Company of Illinois, Chicago, Ill., a corporation of Ohio
No Drawing. Filed Sept. 9, 1963, Ser. No. 307,372
5 Claims. (Cl. 260—268)

This application is a continuation-in-part of my abandoned applications Serial No. 55,850 filed September 14, 1960 and Serial No. 209,309 filed July 12, 1964.

This invention relates to a new method of making amides having the formula

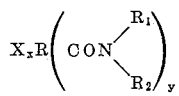

in which R is a saturated or unsaturated, cyclic or acyclic radical from a carboxylic acid which radical is branched or straight chain aliphatic or aromatic and is selected from the class of hydrocarbons, keto-substituted hydrocarbons and hydroxy-substituted hydrocarbons of 2 to 21 or more carbon atoms; $R_1$ and $R_2$ are each an aliphatic hydrocarbon and may be the same or different and together may be in a ring; X is selected from the class consisting of ester radicals and

in which $R_3$ and $R_4$ are as above defined for $R_1$ and $R_2$, and may be the same as $R_1$ and $R_2$ or different; $x$ may be zero, and $x$ and $y$ are whole numbers that total the number of carboxyl groups in said carboxylic acid. The amides are made by reacting an anhydrous ester, preferably acid free, with anhydrous secondary amine in the presence of a catalyst. The catalyst is an alkali metal, or an alkali metal alkoxide derived from a monohydroxy or polyhydroxy alcohol, and may contain one or more hydroxy groups.

The invention includes certain new amides. These amides may be used as solvents, plasticizers for plastics, carriers for drugs, etc. The aleuritamides are more water soluble than other longer chain amides of this class which contain no hydroxyl groups. The levulinamide is more soluble in organic solvents than the amides of similar chain length which do not contain a keto substituent. The half-piperazides possess amine as well as amide characteristics. The amides may be derived from a natural or synthetic source.

The following equation typifies the reaction, using an ester of a monocarboxylic acid and a secondary amine:

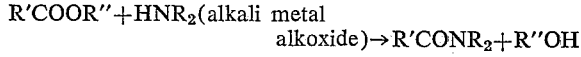

The ester may be an ester of a mono-, di-, tri- or other polycarboxylic acid. Any unesterified carboxyl group will acidify the reaction mixture and interfere with the reaction. If the ester contains two or more carboxylic acid ester groups, one or more X of the above general formula which represents the resulting amide may be an ester group, depending upon the extent to which the ester groups are converted to amide groups.

The carboxlic acid ester is advantageously a naturally occurring glyceride, such as found in cottonseed oil, coconut oil, soyabean oil, castor oil, fish oil, or other vegetable or animal oil or fat, but may be derived from any one of various other natural or synthetic sources, such as foots, pitches, etc. The methyl esters of acids boiling substantially above the boiling point of water are of particular importance, and may be derived from mono-, di-, tri- or tetra-carboxylic acids such as caproate, caprylate, caprate, laurate, myristate, palmitate, stearate, oleate, linoleate or linolenate, dihydroxystearate, cinnamate, and dimethyl adipate, sebacate, isosebacate, succinate, pimelate, and trimethyl citrate, aconitate, tricarballylate and other polymethyl carboxylates. The acid of the ester may be cyclic such as benzoic acid, phthalic acid, malic, maleic, fumaric, terephthalic acid, isophthalic acid, cyclohexanecarboxylic acid, phenylpropionic acid, abietic acid, etc. Instead of the methyl ester, any ester of an alcohol of 1 to 8 or more carbon atoms may be used, except esters of tertiary alcohols. When esters of lower molecular weight acids are used, the alcohol of the ester is of sufficiently higher molecular weight to give an ester with a boiling point substantially higher than the boiling point of water, as for example octyl acetate, etc. The ester may be derived from an ethylene, propylene, butylene, etc. glycol and an acid such as any of the foregoing. Thus, the esters may be alkyl esters of monohydric, dihydric, or trihydric alcohols in which the alkyl group contains 1 to 8 carbon atoms or more. Esters and mixed esters of commercial purity can be used.

In the preliminary stage of the process the ester is made anhydrous and preferably degassed by subjecting it to heat and reduced pressure—the temperature and pressure being dependent upon the boiling point of the ester. After this preliminary stage, the catalyst and anhydrous amine are added, the catalyst being preferably added first and thoroughly mixed with the ester before adding the amine. Ordinarily, the esters which are sold commercially as "anhydrous" are not sufficiently anhydrous to prevent consumption of the catalyst by reason of the reaction of water with the alkoxide and consequent slowing of the reaction and such esters are subjected to heat and vacuum as herein described to render them sufficiently anhydrous for efficient production of amides. Such heat and vacuum treatment removes acid gases (such as $CO_2$, $SO_3$, $SO_2$ and $H_2S$, etc.) to which the esters are exposed under normal conditions of handling, which in the presence of moisture form acids which use up the catalyst. The presence of such acid-forming gases and organic acid in excess of about one percent presents another problem and that is in the gelation of the mixture. These gels are formed by the reaction of the alkaline metal and form colloidally dispersed salts which inhibit the reaction in which the amide is formed. Such gels are also caused by organic acids if present in the ester.

It has been found that when esters have been heated with agitation for 1 hour or more under normal pressure to a temperature of at least 150° C., at which temperature all moisture and gases would be expected to be removed, the amide-forming reaction with the amine did not take place, even in the presence of excess catalyst. The identical ester, after being subjected for the same period of time to a temperature of at least 75° C. and a pressure of no more than 500 mm. of mercury (absolute), such conditions closely approaching the boiling point of the ester, allowed the reaction producing the amide to proceed at a rate satisfactory for commercial production; the higher the vacuum the better, because of the greater amount of deleterious acid gases removed.

The amine used may be any secondary aliphatic hydrocarbon amine such as

Dimethyl amine
Methylethyl amine
Methylpropyl amine
Methylbutylamine
Piperazine
Piperidine
Methyl allyl amine and other methyl secondary amines with longer chain saturated or unsaturated groups containing up to 20 carbon atoms, such as methyl stearyl amine, methyl oleyl amine, etc. In the foregoing, propyl may be n-propyl or isopropyl, and butyl may be n-butyl, sec-butyl or iso-butyl. The t-butyl amines are unreactive or react so slowly as not to be suitable for commercial use.

The catalysts employed commercially will usually be sodium, potassium or an alloy thereof or an alkoxide thereof. The alcohols from which the alkoxides are derived are primary or secondary alcohols. The other alkali metals and their alkoxides can also be used. Ordinarily the alcohol from which the alkoxide is derived is a saturated alcohol, but it may be unsaturated and it may be advantageous to have the alcohol radical the same as that of the alcohol of the ester to prevent the introduction of an additional alcohol into the system. It is conceivable that the alkoxide group of the catalyst may be from glycerine or a glycol in which one or more hydrogens are replaced by metal. The alcohol group of the catalyst is advantageously an alkyl group of 1 to 3 or 4 carbon atoms per OH group. It may be derived from a monohydric, dihydric, trihydric, tetrahydric alcohol or other polyhydric alcohol. The following alkoxides of the alkali metals are representative:

Methoxide
Ethoxide
Propoxide (any isomer)
Butoxide (except tertiary)

The alkali metal derivatives of the higher molecular weight alcohols are slower catalysts and are not generally commercial.

It is known that the amides to which this invention relates can be obtained by reacting an amine with an ester at elevated temperature. The advantage in using a catalyst, as contemplated by this invention is that side reactions and by-products are greatly reduced and lower amines, such as are vaporized at the temperatures required when no catalyst is employed, can be used in reactions starting at or near room temperature or lower and up to a temperature of 60 or even 100° C. depending upon whether the amine is dimethyl amine or other methyl amine, and excellent yields are obtained within periods of time that are commercially feasible.

Higher temperatures accelerate the reaction to a certain degree, but the reaction rate slows at temperatures higher than about 100° C. because of the destruction of the catalyst as shown by the following possible reaction:

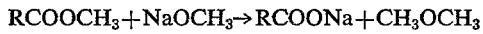
$RCOOCH_3 + NaOCH_3 \rightarrow RCOONa + CH_3OCH_3$

Substantiation of this reaction is found in the fact that dimethyl ether has been detected as a product of a reaction carried out above 100° C.

When an amide is to be made with some ester which is unstable or polymerizes at elevated temperature, the lower temperatures usable in the process of this invention reduce the production of by-products. The acrylates and methacrylates are illustrative of esters which polymerize readily, such as methyl, butyl, 2-ethyl-hexyl, octyl, pelargonyl, decyl, lauryl, stearyl and palmityl acrylates and methacrylates. Vinyl type esters, hydroxy esters and diesters are included. The diesters can be reacted with diamines, such as by reacting dimethyl sebacate, etc. with piperazine, etc. to produce chain compounds.

The reaction is carried out in the presence of 0.01 to 2.0 or 5.0 parts of the alkali metal as metal or as metal in the alkoxide per 100 parts of the anhydrous ester. The efficient amount of catalyst varies with the molecular weight of the alkoxide. The catalyzed amidation reaction gives evidence of being exothermic immediately after the addition of catalyst and amine to the ester and usually, but not necessarily, the initial temperature of the ester is not above room temperature, particularly for the lower boiling amines. Such lower boiling amines (and even the higher boiling amines) can be vaporized and be bubbled through a mixture of the ester and catalyst, or passed countercurrent to such a mixture in a suitable tower. The temperature of the reaction mixture (or the liquid phase of the reaction mixture) at the start of the reaction may be as low as zero or even —20° C. This is a low temperature reaction so there is no need of supplying heat to it, although in the final stage of the reaction, heat may be used, and it is advantageously used for removal of the unreacted amine.

The reaction is most economically carried out with an excess of amine, e.g. with 1 to 1.5 equivalents of amine for each ester group to be changed to an amide group. More amine may be present, but such greater excess does not enter into the reaction and must eventually be separated from the amide that is produced.

REACTIVITY AND ACTIVITY OF ESTERS, AMINES AND CATALYSTS

In this discussion, when we refer to reactivity we mean the speed at which the amines and esters react with one another using a catalyst from the family of alkali metals and alkali metal alkoxides. When we refer to activity we refer to the ability of the alkali metal or alkali metal alkoxide to catalyze the reaction between the ester and the amine. The activity or reactivity group to which situations represented by the conditions of each of the following experiments belong is listed in the last column of the tables.

In Table I, referring to Examples 1 to 7, in the first column, the molecular weight of the methyl esters varies from that of methyl caproate to methyl myristate and methyl oleate, and the reactions with dimethyl amine using sodium methoxide catalyst at various temperatures show that the molecular weight and degree of saturation of the esters do not influence the reactivity rate because the speed of reaction places all of these combinations in Group 1. In Examples 8 to 16, the only variation was the catalyst so the group rating indicates catalyst activity. In Table II, the variables are the amine and the temperature. The group rating is therefore a reactivity rating. In Table III, aromatic and dibasic esters (the latter including esters of both aliphatic and aromatic acids) are the variable. The rating therefore is a reactivity rating. Table IV gives the reactivity rating of reactions using different amines.

A combination of an amine and ester, or a particular catalyst is placed in Group 1 if, at the given temperature, the amide-forming reaction takes place so that at least 50 percent of the amide is formed in two hours or less, when stoichiometric proportions of the ester and the amine are used. If 50 percent of the reaction takes place in about two to eight hours a rating in Group 2 is given. If 50 percent reaction is accomplished in 8 to 24 hours the reactivity of ester and amine, or activity of catalyst is placed in Group 3. If only slight indications of amide formation is noted in 24 hours the group assignment number is 4. If no amide formation is measurable in greater than 24 hours the group number assigned is 5.

In general, from the number of experiments run as shown in Tables I, II, III and IV, we come to the following conclusions about the reactivity of the esters with the various amines using a standard reactive catalyst such as sodium methoxide, ethoxide, butoxide, etc.:

*At room temperature the following esters and amines will react with one another at a speed placing them in Group 1.*

A. ESTERS (1) *Aliphatic.*—Fatty esters of aliphatic alcohols such as methyl, ethyl, butyl, glycerine, etc.
Hydroxy substituted fatty esters of aliphatic alcohols.
Keto-esters of aliphatic alcohols.
Diesters of dibasic acids with aliphatic alcohols.
(2) *Aromatic.*—Benzoic acid esters of methyl, ethyl, butyl alcohols.
Phthalic acid esters of methyl, ethyl, butyl alcohols.

B. DIALKYL AMINES

Dimethyl amine, piperazine, morpholine, piperidine, represented by the formula

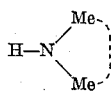

in which Me represents —CH₃ or —CH₂— in a ring, and there may be more than one such reactive amine group within the ring.

It should be noted that although the types of esters which can be used is rather broad, the types of amines which will react at room temperature is limited to dimethyl amine or to structures which fix the position of the alkyl groups on the amino nitrogen in such a way as to allow a reaction to proceed satisfactorily and quickly. Apparently, steric hindrance plays the dominant role.

At higher temperatures such as at 100° C. the same esters given above will react with a larger group of amines, including:

Dimethylamine
Methyl ethyl amine
Methyl propylamine
Methyl butylamine
Piperazine
Piperidine
Morpholine represented by the formula

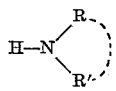

in which each R is —CH₃ or —CH₂— and R' may be any other alkyl group.

The foregoing all belong to Group 1 and are most suited to commercial operations, although catalysts and reactions falling in Groups 2 and 3 may be used commercially at temperatures up to 100° C.

We can generalize about the catalysts used. Catalysts of the alkali metals in which the alkoxide portion is a tertiary alcohol are of no commercial value at temperatures below 100° C. Catalysts of normal alcohols, secondary alcohols, or iso-alcohols are definitely valuable at room temperature and temperatures up to 100° C.

The alloy of sodium-potassium is very reactive but only when added to a mixture already containing one of the alcohols contributing a reactive alkoxide and this applies to alkali metals generally.

added in an attempt to overcome the effects of dissolved moisture, acid gases, and free acids. The total number of gram moles of catalyst-consuming moisture and free acid (gaseous or otherwise) is 18.3 whereas a total of 144 gram moles of catalyst were added. As this total is over seven times as much as theoretically needed it can be seen that merely adding more catalyst is not the answer to the problem of catalyzing this reaction. Example 2 shows that the reaction proceeds easily after the vacuum stripping operation, and much less catalyst is required.

In Example 3, the ester had been subjected to purification and was anhydrous and it was free of acid gases and it was substantially free of other acid. The reaction proceeds without difficulty.

Examples 4 and 5, using saturated and unsaturated esters, respectively, the rating is in Group 1.

Example 1

Four hundred twenty-eight pounds of commercial methyl caproate with an acid number of 2.96 (mgs. of KOH per gram) and a moisture content of 0.074 percent is charged to a 100-gallon reactor equipped with agitator and gas heaters. The ester is heated with agitation to a temperature of 150° C. in order to distill out the moisture and gases dissolved in the ester. Approximately 21 pounds of the ester is distilled off over a period of 2 hours. The reaction mixture is then cooled to 35° C. and 4.28 pounds of sodium methoxide dissolved in 15 pounds of anhydrous methanol is added to the reactor. Then 114 pounds of dimethyl amine is added to the reaction mixture over a period of 2 hours. At the end of 2 hours no temperature rise is noted and therefore another 4.28 pounds of sodium methoxide is added. The agitation is continued for one hour longer and with no temperature rise noted. No reaction is noted, and this time the amount of catalyst added is doubled, with no better results. A heavy gel forms which may be instrumental in hindering a reaction producing the amide. A gas-liquid chromatographic analysis shows that no amide is produced.

Example 2.—N,N-dimethyl caproamide

In this example the reactor is equipped with means to apply a vacuum to the reaction mixture. Four hundred twenty-eight pounds of methyl caproate containing 0.074 percent water and having an acid value of 2.96 (mgs. of KOH per gram) is charged to the reactor and the methyl caproate is heated to 120° C. over a period of 2 hours while at a pressure of 200 mm. Hg, absolute. The heat is applied and agitation continued under the

TABLE I.—N,N-DIMETHYL AMIDES FROM METHYL ESTERS

| Example No. | Ester Methyl | Moles | Dimethyl Amine, Moles | Catalyst Metal | Percent [3] | Alkoxide | Temp., °C. | Group |
|---|---|---|---|---|---|---|---|---|
| 1 | Caproate | 3.13 | 2.64 | Sodium | 1.90 | OCH₃ | 35 | |
| 2 | ...do | 3.13 | 3.13 | ...do | 0.45 | OCH₃ | 35–43 | 1 |
| 3 | Caprylate | .95 | 1.34 | ...do | 0.28 | OCH₃ | Room | 1 |
| 4 | Myristate | 1.0 | 1.27 | ...do | 0.19 | OCH₃ | 0–40 | 1 |
| 5 | Oleate | 1.35 | 1.45 | ...do | 0.25 | OCH₃ | 40–48 | 1 |
| 6 | Soybean [1] | 1.0 | 1.10 | ...do | 0.29 | OCH₃ | 40–60 | 1 |
| 7 | ...do.[1] | 1.0 | 0.5 | ...do | 0.50 | OCH₃ | 25–40 | 1 |
| 8 | ...do.[1] | 1.0 | xs | Lithium | 0.09 | O—C(CH₃)₃ | Room | 4 |
| 9 | ...do.[1] | 1.0 | xs | Potassium | 0.35 | O—C(CH₃)₃ | Room | 4 |
| 10 | ...do.[1] | 1.0 | xs | Rubidium | 0.54 | O—C(CH₃)₃ | Room | 4–5 |
| 11 | ...do.[1] | 1.0 | xs | Cesium | 0.64 | O—C(CH₃)₃ | Room | 4–5 |
| 12 | ...do.[1] | 1.0 | 1.05 | Sodium | 0.50 | O—(CH₂)₃CH₃ | Room | 1 |
| 13 | ...do.[1] | 1.0 | .96 | ...do | 0.50 | O—CH(CH₃)₂ | Room | 1 |
| 14 | ...do.[1] | 1.0 | .96 | Na-K Alloy[2] | 0.75 | O—CH₂CH(CH₃)₂ | Room | 1 |
| 15 | ...do.[1] | 1.0 | xs | ...do | 0.49 | | 25–100 | 3 |
| 16 | ...do.[1] | 1.0 | 0.90 | K-Na Alloy[2] | 0.49–0.81 | OCH₂CH₃ | 25 | 1–3 |

[1] Soybean—Methyl esters of the fatty acids of Soybean Oil.
[2] Potassium—Sodium alloy (77–23).
[3] Percent Catalyst Metal as percent of starting ester weight.

Examples 1 to 5

Example 1 is given to show that a reaction will not take place even when a great amount of catalyst is vacuum until approximately 21 pounds of methyl caproate is collected in the receiver. The conditions of this example are the same as that given in the foregoing example with the exception that a vacuum is applied and the ester is heated to a lower temperature. After the 21 pounds of ester are distilled the reaction mixture is cooled to 35° C. and 4.28 pounds of sodium methoxide dissolved in 15 pounds of anhydrous methanol is added to the reactor. Then 141 pounds of dimethyl amine is added over a period of 2 hours while the reaction mixture is agitated. This temperature of the reaction mixture rises from 35° C. to 43° C., indicating that a reaction is taking place. Gas chromatographic analysis of the reaction mixture indicates that the reaction is 70 percent complete in just 2 hours. The reaction is 91 percent complete after 2 hours more, and at the end of a total time of 8 hours the reaction is 97 percent complete. The reaction mixture was then distilled to give a product with boiling point of 123° C. at 25 mm. Hg (absolute). This example shows the beneficial effects of treating the ester to a reduced pressure for the removal of moisture and dissolved gases.

*Example 3.—N,N-dimethyl caprylamide*

One hundred fifty grams of pure, anhydrous methyl capyrlate (0.95 mol), with acid content of 0.1 percent calculated as caprylic acid, was mixed with 60 grams of dimethyl amine (1.34 mol) at room temperature, and 1 gram of sodium methoxide was added. After standing 2 to 3 hours, the reaction mixture was heated to 50 or 60° C. to remove the unreacted amine. The product was washed with water and then distilled. There was obtained a 95-percent yield of 98 percent pure N,N-dimethyl caprylamine. It had a boiling point of 119–121° C. at 60 mm. Hg pressure.

*Example 4.—N,N-dimethyl myristamide*

Two hundred twenty-eight grams (1 mol) of anhydrous methyl myristate (with 0.0 acid number) was reacted with 57 grams (1.27 mol) of dimethyl amine, using 1 gram of sodium in 10 ml. of anhydrous methyl alcohol as catalyst. The amine was added while the mixture was about 0° C. and it warmed up spontaneously to 40° C. This was allowed to stand 1 hour and then heat was applied to remove the excess amine and bring the reaction to a close. The reaction product was heated rapidly to 100° C. and washed with warm water in a separatory funnel. The purified product was dried and distilled in a vacuum rising from 400 microns to 600 microns at 142–149° C. The freezing point of the compound was 29° C. The yield was 93 percent of 99 percent pure N,N-dimethyl myristamide as determined by gas chromatographic analysis.

*Example 5.—N,N-dimethyl oleamide*

Four hundred pounds of commercial methyl oleate having an acid number of 1 and a moisture content of 0.05 percent is charged to a reactor equipped with agitator, heaters and a source of vacuum. The methyl oleate is heated to 140° C. with good agitation under a pressure at 125 mm. Hg (absolute) over a period of 2 hours. The resulting anhydrous and degassed ester is cooled to 40° C. and then 4 pounds of sodium methoxide dissolved in 12 pounds of anhydrous methanol is added to the reactor. Sixty-five pounds of anhydrous dimethylamine is then added to the reactor with agitation over a period of one hour. Although no heat is applied, the temperature of the reactor contents increases from 40° to 48° C. Stirring is continued for 8 hours longer. The reaction mixture is then washed with warm water to remove sodium and amine soaps of oleic acid, dried and then distilled in a Rodney-Hunt wiped film molecular still at a pressure of 1 mm. Hg and at a temperature of 190 to 200° C. The distilled product analyzes 95 percent amide content consisting of 80 percent N,N-dimethyl oleamide and about 5 percent of each of the following amides:

N,N-dimethyl myristamide
N,N-dimethyl palmitamide
N,N-dimethyl linoleamide
N,N-dimethyl stearamide Five percent of the unreacted methyl oleate remains in the product. The freezing point of the product is −8° C.

*Example 6.—N,N-dimethyl amide of soyabean fatty acids*

Twelve hundred pounds of the methyl esters of soyabean fatty acids with an acid number of 0.5, having the following composition as the acids:

| | Percent |
|---|---|
| Myristic | 1 |
| Pentadecanoic, trace. | |
| Palmitic | 8 |
| Margaric, trace. | |
| Stearic | 3 |
| Oleic | 26 |
| Linoleic | 56 |
| Linolenic | 6 | were converted to the amides by the following steps:

(1) Degassing and demoisturizing by rapid agitation for 2 hours at 150° C. under a vacuum of 15 inches.

(2) Cooling to 40° C., then adding 35 pounds of 25 percent solution of sodium methoxide. (.29 percent sodium based on ester content).

(3) Then adding 200 pounds of anhydrous dimethyl amine over a period of 1½ hours. The anhydrous amine is preferably added as a liquid because of the high heat of solution when added as a gas. It can be added faster when added as a liquid, but care must be taken so that in case reaction did not take place the solubility of the amine is not exceeded and much amine is lost by gassing off. The temperature raises spontaneously to 60° C. and cooling water is applied if temperature raises much above this.

The reaction mixture was then agitated for 8 hours and then:

(4) The excess amine is stripped off under vacuum at 100° C. for 1 hour.

(5) Enough sulfuric acid is added to bring the pH of a 10 percent w./w. slurry of the amide in distilled water to a figure of 3 to 4. In this case, 9.5 pounds of sulfuric acid in 10 pounds of water was added.

(6) The material was agitated one-half hour and then the sodium sulfate and amine sulfate were filtered off.

(7) The product, containing 96 percent N,N-dimethyl amides of soyabean fatty acids can then be used as such or further purified by distillation, bleaching, carbon treated, or any other method for reducing impurities, enhancing the color or the odor.

The methyl ester of soyabean fatty acids used in Examples 7 to 16 having the same composition as the ester of Example 6 were prepared for the amide reaction by degassing and demoisturizing by rapid agitation for 1 hour at 150° C. under a vacuum of 20 mm. of mercury.

*Example 7*

In this example we wished to determine the rapidity of reaction using the methyl esters of soyabean oil as given in Example 6 when there is added only 50 percent of the amine required for a complete reaction. Two hundred ninety-five grams (1.0 M) of the methyl esters of soyabean oil were added to a liter three-necked flask equipped with agitator, vacuum outlet and condenser and heated up to 150° C. while agitating under a pressure of 20 mm. Hg to remove all acidic gases and water (moisture). The flask was then cooled to 30° C. and gaseous dimethylamine was added until 22.5 gms. (0.5 M) were added. Then 0.5 percent of sodium as a 25 percent solution of sodium methoxide in methanol was added and the timer started. By titration and infra-red analysis the reaction was 90 percent complete in 5 minutes and complete in 30 minutes. The product was neutralized with $H_2SO_4$ in water and washed to yield a 50 percent amide solution in methyl ester solvent.

Examples 8 to 11

In these examples we wished to determine if the ter-butoxides of the alkali metals were good catalysts for the amide reaction. The tests using the ter-butoxides of lithium, potassium, rubidium and cesium were all performed the same way. As in Examples 6 and 7, the methyl ester of soyabean oil was used, previously dried and degassed as described above. Dimethyl amine was added to the methyl esters until a saturated solution was obtained and then 1 percent of dry alkali metal ter-butoxide by weight of the methyl ester was added. As Table I shows the reaction rates were very slow using these alkoxides. Of the group lithium and potassium were the best, while cesium and rubidium were poor.

Examples 12 to 16

In this series of experiments different alkali metals and different alkoxides were used to determine the effect on the rate of reaction, and these and other examples are classified into various activity groups in the accompanying tables according to the catalyst employed. In these examples, previously degassed and demoisturized methyl esters of soyabean oil were saturated while cold with gaseous dimethyl amine and the amine present was determined by volumetric acid titration. The catalyst was then added and the timer started to determine to which activity group the catalyst belonged. As before the amide formation was followed by titration and infra-red. All runs at room temperature. The ester-amine mixtures were weighed out so as to contain 100 grams of the methyl ester of soyabean fatty acids.

Example 12

The soyabean methyl esters were supersaturated with dimethyl amine since the mixture contained 13.7 percent dimethylamine by weight. This gave a mole ratio of amine to ester of 1.05. Catalyst (sodium n-butoxide—0.5 percent as sodium) was then added and the timer and agitator started. After 45 minutes the concentration of free amine was reduced to .7 percent. This rapid reaction puts this catalyst in activity Group 1.

Example 13

In this example, the isopropoxide of sodium is tested at the same concentration of sodium of 0.5 percent. The same source of soyabean methyl esters saturated with di-methyl amine was used but the concentration of dimethyl amine had decreased because of some slight gassing off of the dimethyl amine. The starting amine concentration was 12.80 percent. After the catalyst was added and agitated and timer started the amine concentration was reduced to 6.7 percent in 45 minutes. Apparently, the isopropoxide was somewhat slower than the normal butoxide. It is sufficiently reactive to be put in reactivity Group 1. See Table I for details.

Example 14

In this experiment, .755 grams 77 percent potassium, 23 percent sodium alloy was reacted with isobutanol to give an isobutoxide containing an amount of the two metals to be experimentally equivalent (molar basis) to 0.5 percent sodium. On testing this in the same way for reactivity starting with an amine concentration of 12.8 percent this catalyst reduced the free amine to a concentration of 6.7 percent in 50 minutes indicating the catalyst also belongs in Reactivity Group 1.

Example 15

In this experiment, the same potassium-sodium alloy, which is a liquid, was added and dispersed in the same methyl esters of soyabean oil containing, this time, 12.02 percent dimethylamine. The reaction was moderate, only 2 percent of amine being used up in 3 hours and therefore this catalyst belongs to Reactivity Group 3. Since no alcohol was added and none was present at the beginning of the reaction, it indicates that the alloy itself is a catalyst for this reaction.

Example 16

When 5 ml. of ethanol was added to contents of Example 15, the reaction rate was increased so as to place the catalyst on the borderline between Activity Groups 1 and 2. Adding 0.3 gm. of fresh alloy gave a very fast reaction equivalent to the best of Group 1.

TABLE II.—HIGHER ALKYL AMIDES FROM METHYL ESTERS OF SOYABEAN OIL FATTY ACIDS AND THE REACTIVITY OF AMINES WITH SODIUM METHOXIDE CATALYST

| Ex. No. | Ester, Moles | Dialkylamine Amine [1] | Moles | Percent Catalyst [2] | Temp., °C. | Group |
|---|---|---|---|---|---|---|
| 17 | 1.0 | DEA | 1.1 | 0.42–0.84 | 25–30 | 3–4 |
| 18 | 1.0 | DEA | 1.0 | 0.50 | 50–80 | 3 |
| 19 | 1.0 | DEA | 4.0 | 1.00 | 30 | 3 |
| 20 | 1.0 | DPA | 1.0 | 0.5–0.7 | 80 | 4 |
| 21 | 1.0 | MBA | 1.0 | 0.5 | 100 | 1 |
| 22 | 1.0 | MBA | 1.0 | 0.5 | Room | 3 |
| 23 | 1.0 | EBA | 1.0 | 0.5–0.8 | 80 | 4 |
| 24 | 1.0 | EBA | 1.0 | 0.5 | Room | 5 |
| 25 | 1.0 | PAZ | 0.5 | 0.5 | Room | 1 (4–5) |
| 26 | 1.0 | DEHA | 1.0 | 1.0 | 100 | 5 |

[1] DEA—Diethylamine, DPA—Dipropylamine, PAZ—Piperazine, MBA—Methyl Butylamine, EBA—Ethyl Butylamine, DEHA—di-2-ethylhexylamine.
[2] Percent sodium as the methoxide, based on ester weight.

Examples 17 to 26 (see Table II)

In this series of experiments the ester is again the previously degassed and demoisturized methyl esters of soyabean fatty acids. The catalyst was sodium methoxide in all cases, using from .42 percent to 1.0 percent of the metal based on the ester content. Table II gives the details on the mole ratios, temperature, percent catalyst and reactivity. Since sodium methoxide is a catalyst belonging to Activity Group 1, the differences in reaction rate depends largely on the amine used.

The reactions were carried out by mixing the indicated proportions of ester and amine and then adding the catalyst and then starting the timer.

Example 17

The ester (295 gms.) was added to the flask with 80 grams of diethylamine and 11.80 grams of a 25-percent solution of sodium methoxide was added. The appearance of the amide was very slow even after 4 hours, therefore, another 11.80 gms. of catalyst solution was added. After one hour a definite improvement was noted. The reactivity of this amine belong to Group 3 or 4 depending on the amount of catalyst used.

Example 18

This reaction was carried out in the same way except that stoichiometric proportions were used with 0.5 percent catalyst. A higher temperature was used with some benefit. However, the reaction was still slow, belonging to Reactivity Group 3. If this amine is used, either more catalyst is needed to make the reaction commercially feasible or a higher temperature is needed.

Example 19

This example uses four times the required amine in order to determine the effect of a large excess of amine. The reaction was still slow when run with excess catalyst. This belongs in Reactivity Group 3.

Example 20

Dipropylamine is very slow even at 80° C. with up to 0.7 percent catalyst. This reaction can easily be run at 80° C. because it is not as volatile as the diethyl amine.

Using higher temperatures will increase the rate but pressure equipment is required.

*Example 21*

To 147.2 grams (0.5 mole) of the dried methyl ester of soyabean fatty acid was added 0.5 mole of N-methyl, N-butyl amine with 0.5 percent sodium as sodium methoxide. The reaction was run at 100° C. at which temperature the amine belonged to Reactivity Group 1.

*Example 22*

The same reaction was run as shown in Example 21 except that the reaction was run at room temperature. Twenty-nine and eight-tenths grams of N-methyl, N-butyl amine was added to 100 grams of the soyabean methyl ester and the catalyst solution added to give 0.5 percent as sodium. Titration and infra-red analysis showed that the amide was manufactured at a moderate rate putting this amine in Group 3 at this temperature.

*Example 23*

In this experiment and the following, the amine was changed in that the methyl group was replaced by the ethyl group. The methyl ester of soyabean fatty acids were again used with 0.5 percent of sodium as sodium methoxide. One hundred one grams of N-ethyl, N-butyl amine was reacted with 148 grams of methyl ester at 80° C. Even after six hours very little reaction had occurred.

*Example 24*

When the materials of Example 23 were run at room temperature, keeping everything else identical, the reaction, even after 10 hours failed to show even the faintest indication that a reaction was taking place. This places this amine in Reactivity Group 5 or *unreactive at room temperature.*

*Example 25*

In this experiment we wished to determine if this reaction could take place with piperazine. This amine has a structure similar to diethylamine, and half the molecule is similar to dimethylamine, having the same carbon-to-nitrogen ratio. We wished to know if both amine groups were equally reactive. The piperazine was insoluble in the methyl ester and in order to start the reaction 100 grams or 0.34 mole of the soybean esters were heated up to dissolve the amine (14.85 grams or 0.17 mole). Very little of the amine dissolved. After cooling to room temperature, the catalyst was added and a determination was made after one hour. At this time the amount of piperazine amine groups consumed was found to be about exactly one-half of that added. After 10 hours the amount consumed was still the same. We assume therefore, from analytical determinations and infra-red that the half amide, half amine was formed:

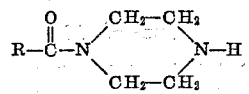

The reaction rate places this amine in Reactivity Group 1 for the first amine group and in Reactivity Group 4 or 5 for the second group, indicating that this amine acts both as a dimethylamine reactive at room temperature and a diethylamine which does not react at room temperature.

*Example 26*

In this experiment 2920 grams of methyl oleate was dried and degassed and then 10 gram moles of di-2-ethylhexylamine were added to the stirred reaction flask. One percent sodium catalyst as the methoxide was added and the mixture heated to 100° C. Even after 16 hours no measurable amide reaction occurred. This amine belongs in Reaction Group 5.

TABLE III.—N,N-DIMETHYL AMIDES OF AROMATIC ACIDS AND DIBASIC ACIDS

| Example No. | Ester | Moles | Moles Amine | Percent Catalyst | Temp., ° C. | Group |
| --- | --- | --- | --- | --- | --- | --- |
| 27 | Methyl benzoate | 1.0 | 1.1 | 0.26 | Rm-50 | 1 |
| 28 | Diethyl isophthalate | 1.0 | 2.2 | 0.2 | Rm-50 | 1 |
| 29 | Dimethyl succinate | 1.0 | 2.22 | 0.14 | Rm-50 | 1 |
| 30 | Dimethyl glutarate | 1.0 | 1.5 | 0.21 | 25-60 | 1 |
| 31 | Dimethyl adipate | 1.0 | 1.0 | 0.29 | 53-72 | 1 |
| 32 | Dibutyl sebacate | 1.0 | 1.26 | 0.20 | 49-58 | 1 |

*Examples 27 to 32*

This series shows how the reaction can be used to make amides from esters and diesters of aliphatic and aromatic acids.

*Example 27.—N,N-dimethyl benzamide*

The following reaction mixture is used:

270 grams of methyl benzoate
0.7 grams of sodium in 5 ml. of $CH_3OH$
125 grams of dimethyl amine The sodium methoxide is added to the benzoate, then all of the dimethyl amine is added. A vigorous reaction ensues, with a rise in temperature to 50° C. in about 2 minutes. After 30 minutes the reaction mixture is heated to 70° C. and the methyl alcohol and unreacted dimethyl amine are collected. Sulfuric acid is added to neutralize the sodium methoxide and the solution is filtered. The solution is freed of water under vacuum and any salt precipitate is filtered off. The benzamide produced is water soluble, so the product is purified by distillation. A first fraction of 72 grams is collected at a temperature of 128° C. and 3.7 mm. of mercury. Then 192 grams is collected up to a temperature of 129° C. at 4.5 mm. of mercury. The liquid residue measures 10 grams. The yield is 71 percent of benzamide (99 percent pure) with a melting point of 42.5–43° C., and a solidification point of 42.5° C. Even though pure, the material supercools quite easily, remaining liquid at room temperature almost indefinitely.

*Example 28.—N,N,N'N'-tetramethyl isophthalamide*

One mole (222 grams; two equivalents) of diethyl isophthalate was placed in a 500-ml., three-necked flask equipped with agitator and outlet line to water condenser. To this was added one gram of powdered sodium methoxide dissolved in 10 ml. of absolute ethanol. Then 2.2 moles (99 grams) of dimethyl amine were added to the flask at 25° C. (Stirring was begun and in a few minutes an exothermic reaction caused the temperature to rise to about 50° C.). The temperature was increased to 90° C. and the vessel was placed under vacuum to remove excess amine and ethyl alcohol. The sodium methoxide was neutralized, the salts filtered off while hot, and a crude product with a melting point of 120 to 129° C. was obtained in nearly 100 percent yield.

Example 29.—N,N,N',N'-tetramethyl succinamide

One mol of dimethyl succinate (146 grams) was placed in a 500-ml., three-necked flask with agitator and outlet and inlet lines. To this flask was added 0.2 gram sodium in 5 ml. of $CH_3OH$. Then 2.22 mols (100 grams) of dimethyl amine at −5° C. was added rapidly. This was stirred and small amounts of excess gaseous amine were caught in a frozen-$CO_2$ receiver. The temperature climbed quickly to 40° C. and then the reaction mixture was heated slowly to 90° C. to drive off excess amine and methyl alcohol. The water soluble product was neutralized with sulfuric acid and filtered and then distilled under low pressure to give a product with melting point 83–86° C. in 90 percent yield (with 5 percent forerun and 5 percent residue on distillation).

Example 30.—N,N-dimethyl glutaramide methyl ester and N,N,N',N'-tetramethyl glutaramide This preparation illustrates the preparation of two compounds simultaneously and separation of them by distillation. Dimethyl glutarate (40 equivalents) or 3200 grams is dried and degassed as described in the previous examples, using a pressure no greater than 500 mm. Hg (absolute). The resulting 97 percent pure material is placed in a 5-liter flask and to it is added 0.20 percent sodium by weight or 64 grams of 25 percent sodium methoxide solution. Gaseous DMA (dimethyl amine) (30 equivalents) is then added over a 2-hour period. During 30 minutes of this time the temperature of the mixture rises from 25° C. to 56° C. and the mixture thereafter is cooled to maintain the temperature around 60° C. Stirring is continued for a total time of 3.5 hours. The stirring is stopped and the mixture is allowed to stand overnight. The mixture is then placed under vacuum of 12 mm. Hg (absolute) to remove by-product MeOH and some free DMA while heat is slowly applied to raise the temperature to 110° C. When the temperature reaches 110° C. the catalyst is neutralized with 13.9 gms. of $H_2SO_4$ and the salts which formed are separated by filtration. The resulting material is then fractionally distilled to give the following compounds, weights and purities. (The following abbreviations are used in the table.)

DMG = dimethyl glutarate
DMGME = N,N-dimethylglutaramide methyl ester
TMG = N,N,N',N'-tetramethyl glutaramide

| Fraction | Composition | M.P., °C. | Pressure, mm. Hg | B.P., °C. | Percent |
|---|---|---|---|---|---|
| 1 | 45% DMG, 55% DMGME | | 12.0 | 129–165 | 9.74 |
| 2 | 98% DMGME | 7.5 | 12.0 | 165–167 | 37.05 |
| 3 | 55% DMGME, 45% TMG | | 0.3 | 103–117 | 3.68 |
| 4 | 98% TMG | 40–45 | 0.3 | 117–133 | 47.44 |
| 5 | Residue Crude TMG | | | | 2.09 |

The TMG, upon recrystallization with a small amount of benzene gave a product melting at 50° C.

Example 31.—N,N-dimethyl adipamide methyl ester and N,N,N',N'-tetramethyl adipamide This material was prepared from dimethyl adipate, which was prepared by esterifying adipic acid with methanol and HCl catalyst. The dimethyl adipate 3480 grams (20 moles) was heated to 120° C. for one hour with vigorous agitation under a pressure of 40 mm. Hg (absolute) to remove moisture and gases. One hundred seventy-four grams of $NaOCH_3$ solution containing the equivalent of 10 grams of sodium was then added after the diester had cooled to 53° C. Gaseous dimethyl amine was then added through a gas dispersion tube to the well-stirred reaction mixture until 20 equivalents of dimethyl amine were added (900 grams). This took place over a period of 2 hours at which time the temperature rose to 72° C. and by-product methanol was removed as a vapor. Agitation was continued 4 hours during which time the temperature dropped to 56° C. During this time the mixture became an opaque tan color and increased in viscosity because of some small amount of gel formation. The temperature was then raised again to 120–130° C. and the mixture agitated under vacuum to remove unreacted dimethyl amine and methanol. The mixture which then consisted of dimethyl adipate, N,N-dimethyl adipamide methyl ester, and N,N,N',N'-tetramethyl adipamide, was then cooled to 35° C. and concentrated HCl added slowly until the pH of a 10-gram sample in 100 ml. of distilled water dropped to 5 or 4. Salts of NaCl and dimethyl amine hydrochloride were then filtered off and then the material was distilled in a 2-inch vacuum jacketed Oldershaw column containing 20 plates. The distillation was carried out at a reflux ratio of 10 to 1 and the fraction distilling at 130° C. at 2 mm. Hg (absolute) was found to contain the N,N-dimethyl adipamide methyl ester (M.P. 8.2° C.). The yield of this fraction was approximately 40 percent by weight of the original starting material. The forerun of this distillation consisted almost entirely of dimethyl adipate, while the undistilled residue consisted almost entirely of crude N,N,N',N'-tetramethyl adipamide having a melting point of 70–80° C. The purified product obtained by distillation of this crude residue on a molecular wiped-film still had a melting point of 81–84° C.

Example 32.—N,N,N',N'-tetramethyl sebacamide

Dibutyl sebacate 2500 g. (15.9 equivalents) in a 5-liter flask was heated to 130° C. under vacuum of 12 mm. Hg (absolute) to remove all trace of water and dissolved gases present in the ester. The catalyst was prepared by dissolving 0.2 percent by weight of the ester or 5 g. sodium in 45 g. of anhydrous methanol to form the pure, dry, solution of sodium methoxide in methanol. The solution of dibutyl sebacate was then cooled to 49° C. before addition of the catalyst in order to prevent destruction of its catalytic activity, and the catalyst was added to the dry ester while protecting it from moist air. Then 450 g. of the dimethyl amine (10 equivalents) was added during 9 minutes while the temperature of the reaction mixture rose to 58° C. The reaction mixture was then cooled to 30° C. After 14 minutes the temperature stopped rising and the addition of dimethyl amine was renewed until a total of 20 equivalents were added. The addition of the amine was complete after 31 minutes. At this time the temperature was 40° C. Twenty-four minutes later the temperature reached 46° C. and the reaction rate slowed as evidenced by the decline in the temperature. The mixture was allowed to stand overnight without stirring and then it was heated to 130° C. under vacuum until the by-product butanol and excess amine were removed. This was then neutralized with hydrochloric acid to a pH of 5 as shown when 10 grams of the mixture was dissolved in 100 ml. of distilled water, and filtered while hot.

The material had a very high boiling point. (Very little distilled at 220° C. and 0.5 mm. Hg (absolute).) Therefore it was purified by recrystallization in three to four times its weight of a solvent system composed of 2 parts of benzene and 1 part of iso-octane. The first crystallization gave a product having a melting point of 85° C.; the second recrystallization gave a product having a melting point of 89° C.

Similar procedures to those described above can be used to prepare the following:

| | B.P., °C. | M.P., °C. |
|---|---|---|
| N,N,N',N'-tetramethyl malonamide | 157–159(8) | (¹) |
| N,N,N',N'-tetramethyl oxalamide | | 79.5–84 |
| N,N,N',N'-tetramethyl azeleamide | | 40–41 |
| N,N,N',N'-tetramethyl o-phthalamide | 146(1) | |
| N,N,N',N'-tetramethyl iso-phthalamide | | 124–129 |
| N,N-dimethyl o-phthalamide methyl ester | | |
| N,N-dimethyl aleuritamide | | 64–66 |
| N,N-dimethyl levulinamide | 90–95(10) | |

¹ Sets to glass at –40° C.

TABLE IV.—AMIDES FROM GLYCERIDES AND THE REACTIVITY OF DIFFERENT AMINES

| Ex. No. | Glyceride | Moles | Amine | Moles | Percent Sodium as Methoxide | Temp., °C. | Group |
|---|---|---|---|---|---|---|---|
| 33 | Safflower oil | 1.0 | DPA | 1.33 | 0.5 | Room | 5 |
| 34 | do | 1.0 | DEA | 1.33 | 0.85 | Room | 5 |
| 35 | do | 1.0 | MBA | 1.1 | 0.75 | 80 | 4 |
| 36 | do | 1.0 | EBA | 1.33 | 0.50 | 80 | 5 |
| 37 | do | 1.0 | DMA | 0.65 | 0.56 | Room | 1 |
| 38 | do | 1.0 | MBA | 1.05 | 0.50 | 100 | 1 |
| 39 | Peanut oil | 1.0 | MBA | 1.00 | 0.5 | Room | 4–5 |
| 40 | Tallow | 1.0 | DMA | 1.0 | 0.22 | 70 | 1 |

*Examples 33 to 40*

In this series of examples the examples of the saturated and unsaturated natural glycerides were reacted with various dried and degassed amines to determine reactivity using sodium methoxide catalyst and different temperatures.

*Example 33*

Two hundred ninety-three grams (0.315 mole) of refined safflower oil, containing the following fatty acids as their glycerides:

| | Percent |
|---|---|
| Palmitic acid | 8.0 |
| Stearic acid | 3.0 |
| Oleic | 13.5 |
| Linoleic | 75.0 |
| Linolenic | 0.5 | were placed in a 500 ml., three-necked flask equipped with an inlet tube, thermometer and stirring paddles and was then heated to 150° C. under 10 mm. Hg. to remove acid gases such as carbon dioxide, NO, $NO_2H_2S$, HCl, etc., and moisture. The mixture was cooled to 50° C. and then 14.7 grams of a 25-percent solution of sodium methoxide in methanol was added with rapid agitation. This amounts to a catalyst concentration of sodium based on the ester of 0.50 percent. Then 101 grams of dry dipropylamine was added. After 24 hours no reaction occurred even when additional catalyst is added.

*Example 34*

When diethyl amine is used as the amine under the same conditions as in Example 33 no reactions occurred.

*Example 35*

When N-methyl N-butyl amine was used as the amine, under the same conditions as in Example 33, a slow reaction occurred at 80° C.

*Example 36*

When N-ethyl, N-butyl amine was used as the amine under the same conditions as in Example 33, no reaction occurred.

*Example 37.—N,N-dimethyl amide of safflower fatty acids*

Two hundred ninety-three grams (0.315 mole) of refined safflower oil, containing the fatty acids given in Example 33 were placed in a 500 ml., three-necked flask equipped with an inlet tube, thermometer and stirring paddles and was then heated to 150° C. under 10 mm. Hg to remove acid gases such as carbon dioxide, NO, $NO_2$, $H_2S$, HCl, etc., and moisture. The mixture was cooled to 50° C. and then 14.7 grams of a 25-percent solution of sodium methoxide in methanol was added with rapid agitation. This amounts to a catalyst concentration based on the ester of 0.56 percent. Then gaseous dimethyl amine was added to the mixture through a dispersion tube, 65.5 percent of the stoichiometric requirement was added.

The reaction proceeded at a satisfactory rate, the amine being almost consumed after one hour, 90 percent in 2 hours and almost entirely in 5 hours. This rate is approximately half the rate of the reaction when the methyl ester of soyabean fatty acid was used. The reaction of dimethylamine at room temperature placed in Group 1. A partially reacted mixture, containing approximately 66 percent of the N,N-dimethyl amides of the original fatty acids was obtained. The remaining fatty acids tied up as mono- and di-glycerides containing some free glycerine can be used commercially as such, since the presence of the mono-and di-glycerides is oftentimes desirable as additives for their surface activity. If more amine is added, the reaction can be made to go completely to the amides, whereupon the glycerine can be washed out or recovered, as desired.

Under the same conditions, if methyl esters of soyabean oil had been used the reaction could have been 90 percent converted in one-half hour or less.

*Example 38.—N-methyl, N-butyl amides of the fatty acids of safflower oil*

Safflower oil of the composition given in Example 33, 205 grams (.22 mole or .66 equivalent), was subjected to heat and vacuum to remove gases and moisture and then 10.25 grams of 25-percent solution of sodium methoxide (0.5 percent) was added (.047 mole) and .7 mole (61 grams) of the amine was added and the mixture refluxed with stirring for several hours. The reaction was 40 percent complete in 3 hours and 60 percent complete in 5 hours as determined by infra-red. It was necessary to react at 100° C. for 20 hours to complete the reaction to 95 percent.

*Example 39*

In this example a less saturated glyceride oil is used. One hundred grams of dehydrated and degassed peanut oil (.114 mole of the oil) is mixed with 29.75 grams of N-methyl, N-butyl amine and 0.5 percent sodium as sodium methoxide catalyst added. At room temperature the reaction was quite slow, putting it in Reactivity Group 4. Raising the temperature to 100° C. would put the amine in Reactivity Group 1.

*Example 40.—N,N-dimethyl tallow amide*

This example shows how a dehydrated and degassed saturated glyceride can be converted to N,N-dimethyl amides.

About equivalent amounts of anhydrous dimethyl amine and tallow fat were used. One pound of the fat and 1 gram of sodium in 10 ml. of methyl alcohol were this temperature at such a rate that none escaped. The dimethyl amine was bubbled into the molten mixture at this temperature at such a rate that none escaped. The resulting reaction mixture was kept warm overnight. By morning a lower layer of glycerine had separated. The glycerine was separated and the remaining reaction product was washed with water. It was distilled at 500 micron pressure at 170–195° C. The yield was only about 70 percent because some of the reaction product was lost in washing because of the formation of a difficultly separable emulsion. It contained about ⅓ N,N-dimethyl palmitamide and ⅔ N,N-dimethyl stearamide.

The invention is covered in the claims which follow. What I claim is:

1. The process of producing an amide which comprises bringing (1) an anhydrous amine of the class consisting of dimethylamine and piperazine and (2) an anhydrous carboxylic acid ester into reactive relation at a temperature between 20° C. and 60° C. in the presence of an alkoxide of an alkali metal of the class consisting of sodium and potassium in which the alkyl group contains 1 to 4 carbon atoms, the carboxylic acid comprising 1 to 4 carboxyl groups attached to a saturated or unsaturated, cyclic or acyclic, aliphatic-hydrocarbon or aromatic-hydrocarbon or hydroxy-substituted-hydrocarbon or keto substituted-hydrocarbon chain of 2 to 21 carbon atoms, and the ester group being derived from alcohols of 1 to 8 carbon atoms, except tertiary alcohols; producing a dimethylamide in the reaction with dimethylamine and producing a half-amide, half-amine of piperazine in the reaction with piperazine.

2. The process of claim 1 in which the ester is essentially acid free.

3. The process of claim 1 in which dimethylamine is used as the amine.

4. The process of claim 1 in which piperazine is used as the amine.

5. The process of producing a mixture of amides which comprises bringing anhydrous dimethylamine and essentially anhydrous molten tallow into reactive relation at a temperature not substantially above that at which the tallow becomes molten, in the presence of an alkoxide of an alkali metal of the class consisting of sodium and potassium in which the alkali group contains 1 to 4 carbon atoms, and keeping the resulting mixture warm at a temperature not above said temperature at which the tallow becomes molten until a layer of glycerine has separated and then separating the glycerine from the remaining reaction mixture which contains N,N-dimethyl palmitamide and N,N-dimethyl stearamide, and thereafter recovering the amides from the resulting reaction mixture.

References Cited by the Examiner

UNITED STATES PATENTS

| | | | |
|---|---|---|---|
| 2,464,094 | 3/1949 | Meade | 260—404 |
| 2,627,487 | 2/1953 | Drake et al. | 167—22 |
| 2,843,612 | 7/1958 | Ricciardi et al. | 260—404 |
| 2,844,609 | 7/1958 | Tesoro | 260—404 |
| 2,863,888 | 12/1958 | Schurman | 260—404 |
| 2,880,209 | 3/1959 | Morton | 260—268 |
| 2,882,271 | 4/1959 | Janssen | 260—268 XR |

OTHER REFERENCES

Tschelinzew et al.: Deutsche Chemische Gesellschaft Berichte, vol. 69 B, pages 2023 to 2026 (July–December, 1936).

ALEX MAZEL, *Primary Examiner.*

NICHOLAS S. RIZZO, *Examiner.*

JAMES W. ADAMS, JR., *Assistant Examiner.*